No. 688,498. Patented Dec. 10, 1901.
G. F. BAILEY.
AUTOMATIC MACHINE FOR MAKING METAL SCREWS, &c.
(Application filed Oct. 26, 1900.)
(No Model.) 9 Sheets—Sheet 1.

No. 688,498. Patented Dec. 10, 1901.
G. F. BAILEY.
AUTOMATIC MACHINE FOR MAKING METAL SCREWS, &c.
(Application filed Oct. 26, 1900.)
(No Model.) 9 Sheets—Sheet 2.

WITNESSES
R. Henry Marlin
Lillian J. Basford

INVENTOR.
George F. Bailey,
by H. Teschemacher
Atty.

No. 688,498. Patented Dec. 10, 1901.
G. F. BAILEY.
AUTOMATIC MACHINE FOR MAKING METAL SCREWS, &c.
(Application filed Oct. 26, 1900.)
(No Model.) 9 Sheets—Sheet 3.

Witnesses:
R. Henry Marsh.
Lillian J. Basford.

Inventor:
George F. Bailey,
by Teschemacher
Att'y.

No. 688,498. Patented Dec. 10, 1901.
G. F. BAILEY.
AUTOMATIC MACHINE FOR MAKING METAL SCREWS, &c.
(Application filed Oct. 26, 1900.)

(No Model.) 9 Sheets—Sheet 4.

No. 688,498. Patented Dec. 10, 1901.
G. F. BAILEY.
AUTOMATIC MACHINE FOR MAKING METAL SCREWS, &c.
(Application filed Oct. 26, 1900.)
(No Model.) 9 Sheets—Sheet 5.

No. 688,498. Patented Dec. 10, 1901.
G. F. BAILEY.
AUTOMATIC MACHINE FOR MAKING METAL SCREWS, &c.
(Application filed Oct. 26, 1900.)
(No Model.) 9 Sheets—Sheet 7.

Witnesses.

Inventor.
George F. Bailey,

UNITED STATES PATENT OFFICE.

GEORGE F. BAILEY, OF WALTHAM, MASSACHUSETTS, ASSIGNOR TO THE WALTHAM SCREW COMPANY, OF WALTHAM, MASSACHUSETTS, A CORPORATION OF MASSACHUSETTS.

AUTOMATIC MACHINE FOR MAKING METAL SCREWS, &c.

SPECIFICATION forming part of Letters Patent No. 688,498, dated December 10, 1901.

Application filed October 26, 1900. Serial No. 34,496. (No model.)

*To all whom it may concern:*

Be it known that I, GEORGE F. BAILEY, a citizen of the United States, residing at Waltham, in the county of Middlesex and State of Massachusetts, have invented certain Improvements in Automatic Machines for Making Metal Screws and other Analogous Articles, of which the following is a specification.

My invention relates to automatic machines for making metal screws and other analogous articles, and has for its object to greatly simplify the construction of machines of this description and at the same time render them more effective and capable of increased production.

To this end my invention consists in certain novel features, combinations of parts, and details of construction, as hereinafter more fully described, and specifically pointed out in the claims.

In the accompanying drawings, Fig. 8$^a$ is a transverse vertical section similar to that shown in Fig. 8, showing the parts in the same position as in Fig. 1. Fig. 9$^a$ is a transverse vertical section similar to that shown in Fig. 9, but showing the parts in a different position. Fig. 10 is a sectional detail of the stop for the stock-rod on the line 10 10 of Fig. 1. Fig. 12 is an enlarged sectional detail on the line 12 12 of Fig. 1. Fig 18 is a horizontal section of the same, showing a screw held in the chuck ready for the slotting-saw.

In the said drawings, 10 represents the bed of the machine, which is provided with three longitudinal parallel grooves 12, in which fit tongues 14 on the bottoms of the head and tail stocks and the several brackets for supporting the operating parts of the machine, the said head and tail stocks and brackets, which are held in place by suitable bolts or screws, being thereby maintained in their proper relative positions with respect to each other and kept in perfect parallelism. The upper surface of the bed 10 is preferably made slightly concave to retain the oil drippings from the spouts which supply oil to the operating parts of the machine.

15 denotes the driving-shaft, on which is fixed the grooved cone-shaped driving-pulley 16, (shown in Fig. 2,) said shaft 15 being journaled in a bracket 22 and provided with a worm 17, which meshes with a worm-wheel 18 on the horizontal cam-shaft 19, which is supported in suitable bearings in the brackets 20 21 and carries all of the cams used in operating the machine.

The wire or stock-rod 23, from which the screws are made, is cut into suitable lengths and passes through a tubular guide on the bench (not shown) into and through a tubular spindle 24, which I term the "feed-tube" or "push-chuck" spindle, said spindle having screwed into its front end a removable friction-chuck 25, split lengthwise to form spring-jaws, which grasp the wire with sufficient friction to feed it forward against a stop, to be hereinafter described, when the spindle 24 is moved in the direction of its length by mechanism to be hereinafter described.

Figure 5:
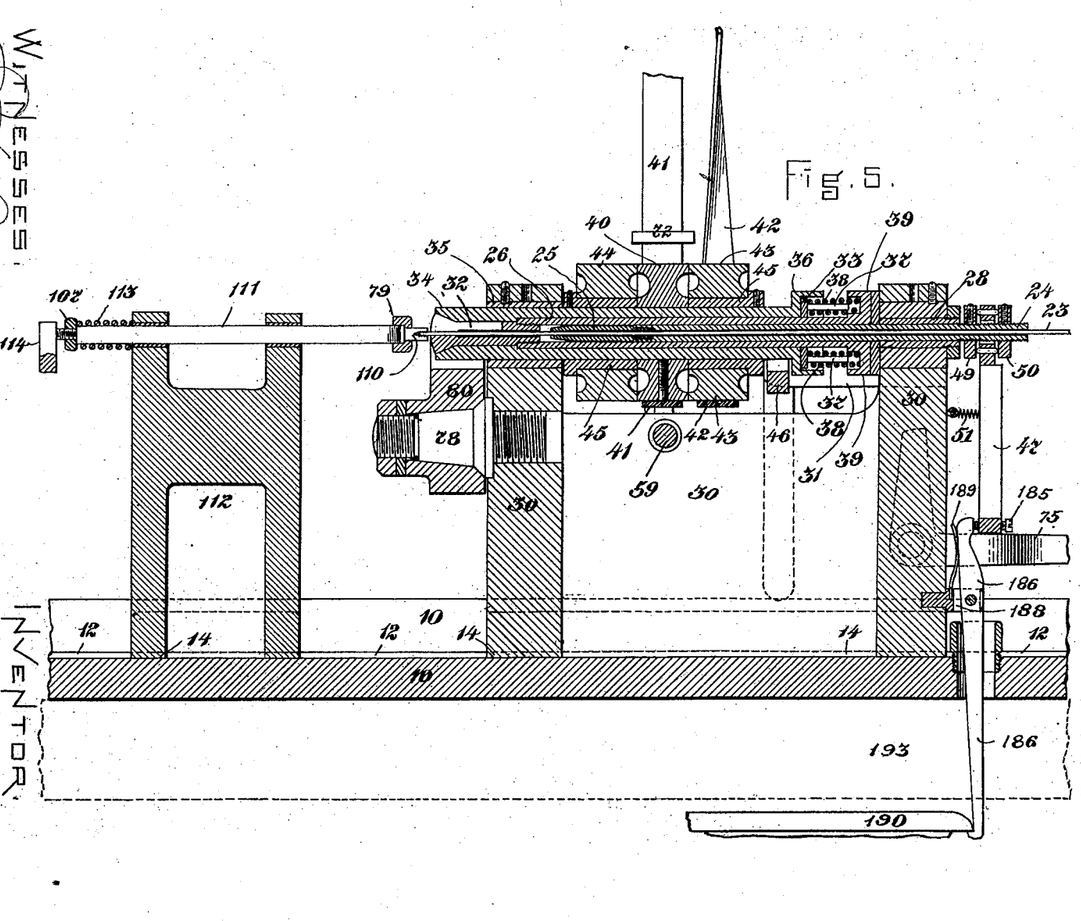
Fig. 5 is a longitudinal vertical section on the line 5 5 of Fig. 1.

The spindle 24 is encircled by and is free to turn within a second tubular spindle 26, the rear end of which rests in a bearing 28 at the rear end of the head-stock 30. This spindle 26, which I term the "drawing-in" spindle, has no longitudinal movement and carries at its front end a conical wire-gripping chuck 32, split lengthwise for a portion of its length to form spring-jaws, which are normally open and through which the wire is pushed against a stop, to be hereinafter described, by the forward movement of the push-chuck spindle. Outside the spindle 26 and forming a bearing therefor is a third tubular spindle 34, which extends over a portion only of the length of the spindle 26, as shown in Fig. 5, and is supported at its front end in a bearing 35 at the front end of the head-stock. The interior of the mouth or front end of the spindle 34 is made tapering or beveled to fit the conical end of the chuck 32, and said spindle is provided at its rear end with a barrel-hub 36, in which is placed a washer 33, from which projects rearwardly a series of pins 37, which support a series of spiral springs 38, which enter recesses in and bear against a flanged collar 39 on the second spindle 26, thereby forcing the outer spindle 34 forward and causing its flaring mouth to act on the outer beveled surface of the cone-shaped gripping-chuck 32 to close its spring-jaws tightly upon the wire or stock-rod previously pushed through the same against its stop by the forward movement of the push-chuck spindle. The friction thus produced will enable the outer spindle to rotate the second spindle with the wire, the latter imparting its rotary motion to the inner spindle by reason of the friction of the push-chuck 25 upon the wire.

The pins 37 prevent the springs 38 from buckling under pressure, and the washer 33, being free to turn independently of the barrel-hub 36, insures the retention of the springs in place in case the outer sleeve should turn a little in advance or behind the chuck-holding spindle, as might occur when the chuck is being changed. The outer spindle 34 carries the fast pulley 40, over which passes alternately a straight belt 41 and a cross-belt 42, running over pulleys on a counter-shaft, (not shown,) whereby the spindle 34 is rotated alternately in opposite directions, and with it the chuck 32 and stock-rod gripped thereby.

On opposite sides of the fast pulley 40 are two loose pulleys 43 44, one for the straight belt and one for the crossed belt, said loose pulleys rotating on hardened-steel bushings 45, fast on the outer spindle, as shown in Fig. 5. These bushings receive the wear of the loose pulleys and avoid the necessity of hardening the spindle throughout its entire length, as would otherwise be required, it being only necessary to harden the spindle at its thickest portion, where it rests in the bearings of the head-stock, thus saving expense and liability of fracture in hardening the spindle owing to its variable thickness. Furthermore, when these bushings become worn they can be easily removed and replaced at a trifling expense and the cost of an entire new spindle thus avoided.

The longitudinal movement of the spindle 24 to produce the feed of the stock is effected by a lever 47, fulcrumed at 48 and fitting loosely between two collars 49 50, adjustable on the threaded rear portion of said spindle 24, said lever being actuated against the resistance of a spring 51 by a cam 52 on the face of the worm-wheel, the forward movement of the lever 47 to effect the feed of this stock-wire being produced by the spring 51 and its retraction by the cam 52. By adjusting the collars 49 50 to vary their distance apart the lever 47 will have more or less lost motion before coming into contact with either collar, thereby varying the amount of feed of the wire for screws of different lengths.

Figure 6:
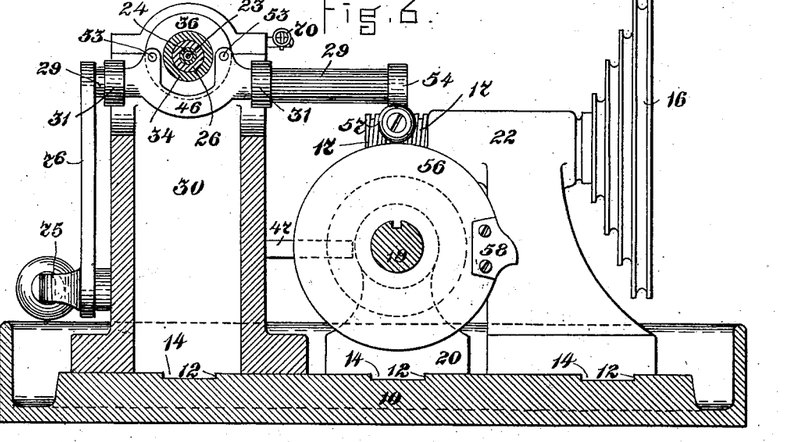
Fig. 6 is a transverse vertical section on the line 6 6 of Fig. 1.

The feed of the wire takes place as soon as the jaws of the gripping-chuck 32 are permitted to spring open to release it, which is effected by a slight longitudinal retraction of the outer spindle 34 on the second spindle 26 against the resistance of the springs 38, which movement is produced by a lever 54, secured to the end of a rock-shaft 29, supported in brackets 31, said rock-shaft being provided between the brackets with a yoke 46, embracing the spindle 34 and having round-ended pins 53, which bear against the hub 36, said lever being actuated against the resistance of springs 38 by a cam 56 on the camshaft 19. (Shown in Figs. 2, 5, and 6.) As soon as the lever 54 is released by the cam 56 the outer spindle is again forced forward by the springs 38 to cause the jaws of the gripping-chuck 32 to clamp the stock-wire, immediately after which the inner spindle 24 is drawn back by the lever 47, causing the spring-jaws of the push-chuck to slip back frictionally over the wire to take a fresh hold for the next feed.

The cam 56 consists of a disk provided with a removable piece 58 of hardened steel, which is brought into contact with a friction-roll 57 on one end of the lever 54 when the latter is to be actuated. By adjusting the position of this cam-piece 58 on the disk the time when the gripping-chuck is permitted to open to release the wire may be varied, as a variation in the amount of stock for screws of different lengths requires a longer or a shorter time for the threading-die to do its work, and consequently the cam is adjusted so that the wire will not be released by its gripping-chuck until the proper time. Furthermore, only the piece 58 requires to be hardened, while the main portion of the disk 56 may be composed of ordinary metal, thus saving expense in construction and doing away with the necessity of a number of different cams.

I will now describe the manner in which the straight and crossed belts are alternately shipped onto and off the fast pulley to rotate the tubular spindle and stock-wire in opposite directions.

Figure 7:
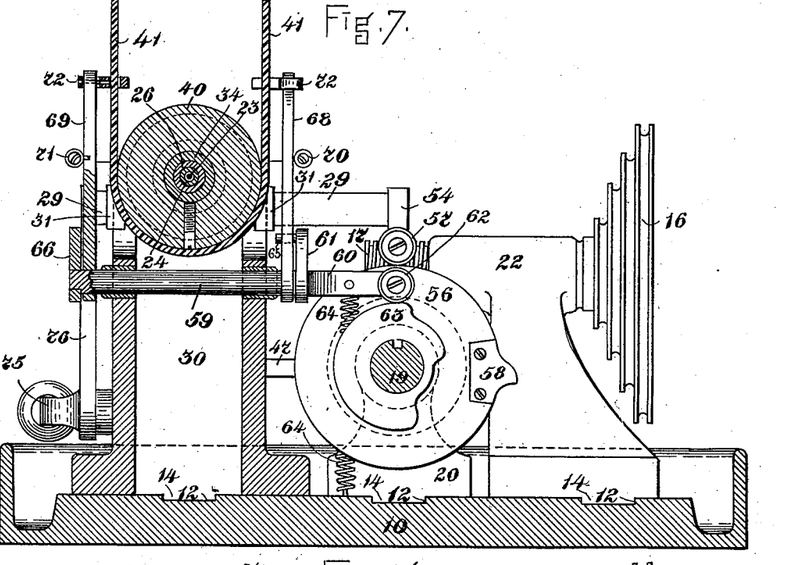
Fig. 7 is a transverse vertical section on the line 7 7 of Fig. 1.

59 is a rock-shaft passing transversely through the head-stock 30, which forms a bearing therefor. To one end of this shaft 59 is secured an angle-lever 60, from the upwardly-inclined arm 61 of which projects a stud 65, the lower arm of this lever carrying at its extremity a cam-roll 62, held in contact with a cam 63 on the cam-shaft 19 by a spring 64, secured to the lever and to the bed-plate. (Shown in Figs. 1, 2, and 7.) To the opposite end of the lever 59 is secured an upwardly-extending arm 66, which is inclined in the direction opposite to that of the arm 61 on the other side of the head-stock, and like it is provided at its upper end with a stud 67.

68 69 are two belt-shipping arms or levers arranged on opposite sides of the head-stock and pivoted on the shaft 59, so as to turn freely thereon. These arms are drawn in opposite directions against suitable stops 73 and 74 and held, respectively, in contact with the studs 61 67 by two spiral springs 70 71, and each arm carries at its upper end a pivoted or swiveling frame 72, forming a guide through which passes one of the belts 41 42. The shape of the cam 63 is such that both belts being upon their loose pulleys the straight belt will first be shipped onto the fast pulley and then back again onto its loose pulley, when the crossed belt will be instantly moved onto the fast pulley to reverse the rotation of the spindle and then returned to its loose pulley on the left, the straight belt remaining on its loose pulley at the right, when the spindle will remain at rest.

If the machine should be stopped when both belts are on their loose pulleys and the clamping-chuck is gripping the wire, and it should be desired to open the chuck to change or replenish the stock, the outer spindle 34 may be drawn back by means of a hand-lever 75, fulcrumed to the head-stock and acting against a crank-arm 76, depending from the rock-shaft 29, which is thus actuated to produce the desired retraction of the spindle to permit the jaws of the chuck 32 to spring open.

Different sizes of gripping-chucks are employed for the various sizes of stock-wire required for screws of different sizes, the interior bore of the innermost spindle 24 being of sufficient diameter to accommodate stock of the largest size which can be employed in the machine.

To the front end of the head-stock on a conical stud 78, located beneath and in the same vertical plane with the center of the wire-holding chuck 32, is pivoted a frame or rocker 80, which carries on one side of said wire-holding chuck a disk 81, which in one position of the rocker forms a stop against which the stock-wire is pushed when fed forward by the push-chuck spindle 24. On the opposite side of the pivot 78 the rocker carries the cutting-tool 82, which when the rocker is oscillated in the opposite direction is brought into contact with the end of the stock for the purpose of turning the same to form the screw. On the upper flat side of the rocker 80 is a dovetail groove, in which is fitted a sliding block 83, adjustable in the direction of the length of the rocker and transversely of the machine by means of a screw 84, and from this block 83 projects a threaded stud 85, on which turns the interiorly-threaded disk stop 81, which is thus made adjustable in the direction of the length of the machine toward and from the wire-gripping chuck for different lengths of screws. This longitudinal adjustment also enable the stop-disk 81 to be so placed as to catch the stock-wire either by intercepting its point or the shoulder under the screw-head, the latter when the screw has a sharp point and it is desired to prevent injury to the point by contact with the stop. In connection with the longitudinal adjustment of the stop 81 on its threaded stud 85 to catch the point or the shoulder of the screw it will be necessary to adjust the stop transversely of the machine by means of the sliding block 83 and screw 84, so that it will project beyond the line of axis of the stock to intercept its end or only sufficiently far to catch the shoulder under the head. The stop 81 is clamped in position on its threaded supporting-stud 85 by means of set-screws 86, which pass axially through the hub of the stop 81 and bear on soft-metal plugs 87 in contact with the thread of the stud, which is thereby preserved from injury.

Figures 8, 11:
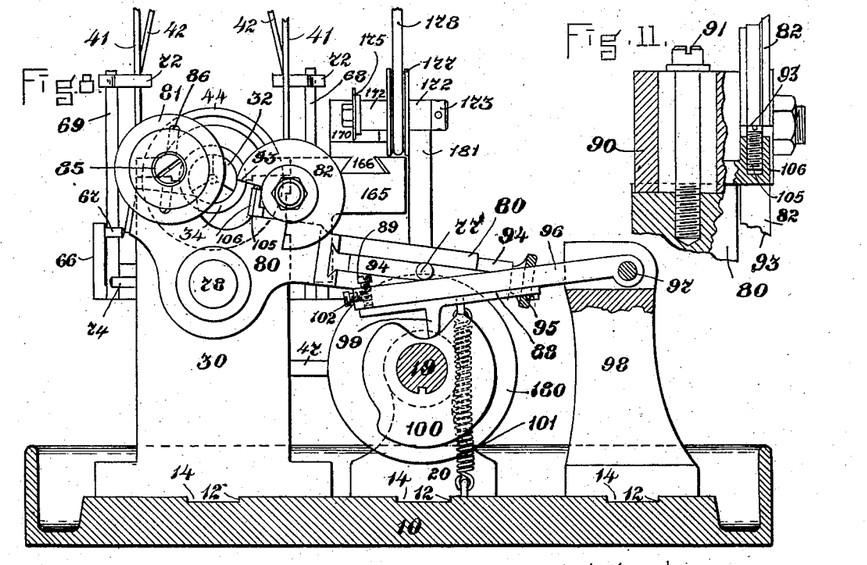
Fig. 8 is a transverse vertical section on the line 8 8 of Fig. 1, showing the stop in a position to intercept the end of the stock rod or wire.
Fig. 11 is a sectional detail on the line 11 11 of Fig. 1.
Figures 8A, 10:
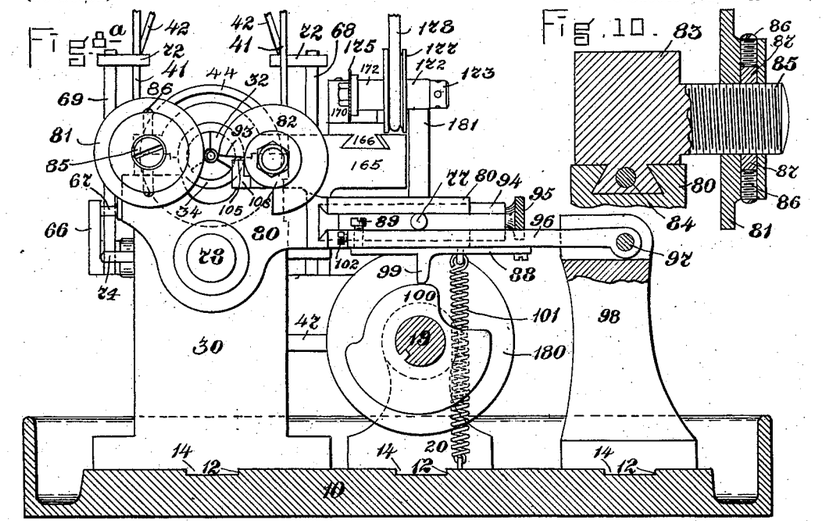

On the rear side of the pivot or stud 78 the rocker 80 is provided on its flat upper side with an adjustable block 90, (shown in Figs. 1, 2, and 11,) sliding in a groove extending transversely across the rocker and parallel with the spindles, said block being clamped when adjusted by means of a screw 91, and from this block projects a stud on which is fastened by means of a nut the circular shaping tool or cutter 82, having a cutting edge 93 of proper shape to turn the stock-wire to form the screw, said cutter being brought into operative contact with the rotating wire when the long arm of the rocker 80 is raised, which movement at the same time carries the stop-disk 81 out of the path of the wire. By adjusting the slide 90 in the direction of the length of the machine the position of the cutting-tool may be varied to form screw-heads of different lengths.

In a dovetail groove on the front side of the long arm of the rocker 80 and extending in the direction of its length is fitted a slide 94 adjustable longitudinally in said groove by means of a screw 95, said slide being provided with a horizontally-projecting pin 77, which rests on the upper side of a lever 96, pivoted at 97 to a bracket 98 and having on its under side a flat spring 88, secured thereto at one end by a screw and provided with a downwardly-projecting toe 99, bearing on a cam 100 on the cam-shaft 19, said cam acting through the lever 96 on the pin 77 to operate the rocker 80 against the resistance of a spring 101, which keeps the toe in contact with the cam, said spring having one end connected with the rocker and the other end with the bed of the machine.

89 is an adjusting-screw passing through the lever 96 and bearing on the free end of the spring 88, whereby the toe 99 may be forced downward from the lever 96 to compensate for wear by contact with the cam 100, said screw 89 being clamped when adjusted by a set-screw 102. The bracket 98 has two cheeks, one on each side of the lever 96, which serve as guides therefor and prevent lateral motion as the lever rises and falls. By adjusting the slide 94 the distance of the pin 77 from the fulcrum 97 of the lever 96 may be varied to change the degree of oscillation of the rocker and the consequent forward throw of the cutter for stock of different diameters or where more or less turning of the stock is required to vary the diameter of the body of the screw. The cam 100 has three rises or portions at different distances from its center. The first or longest one is a gradually-increasing rise, used when the cutter is turning the stock as it causes the cutting-tool 82 to gradually approach the line of axis of the stock. The second or middle portion of the cam is concentric and holds the rocker 80 in a central position while the threading-die, to be hereinafter described, is running on and off the end of the wire. The third or lowest portion of the cam allows the rocker to move backward to withdraw the cutting-tool and at the same time bring the disk stop 81 in front of the wire-gripping chuck to intercept the stock-wire when next fed forward and determine the length of the screw, as previously described.

It will be obvious from the foregoing that all of the required variations in the amount of movement which it may be desired to give to the rocker 80 may be produced by the simple adjustment of the slide 94, thus obviating the necessity of a change of cams for operating said rocker. As the cutter becomes worn from grinding it can be adjusted around its axis by means of a screw 105, projecting from a small angular piece 106, Figs. 8 and 11, said screw forming a stop for the cutting-tool, the cutting edge 93 of which can thus be brought to its proper level with relation to the center of the stock.

Figure 1:
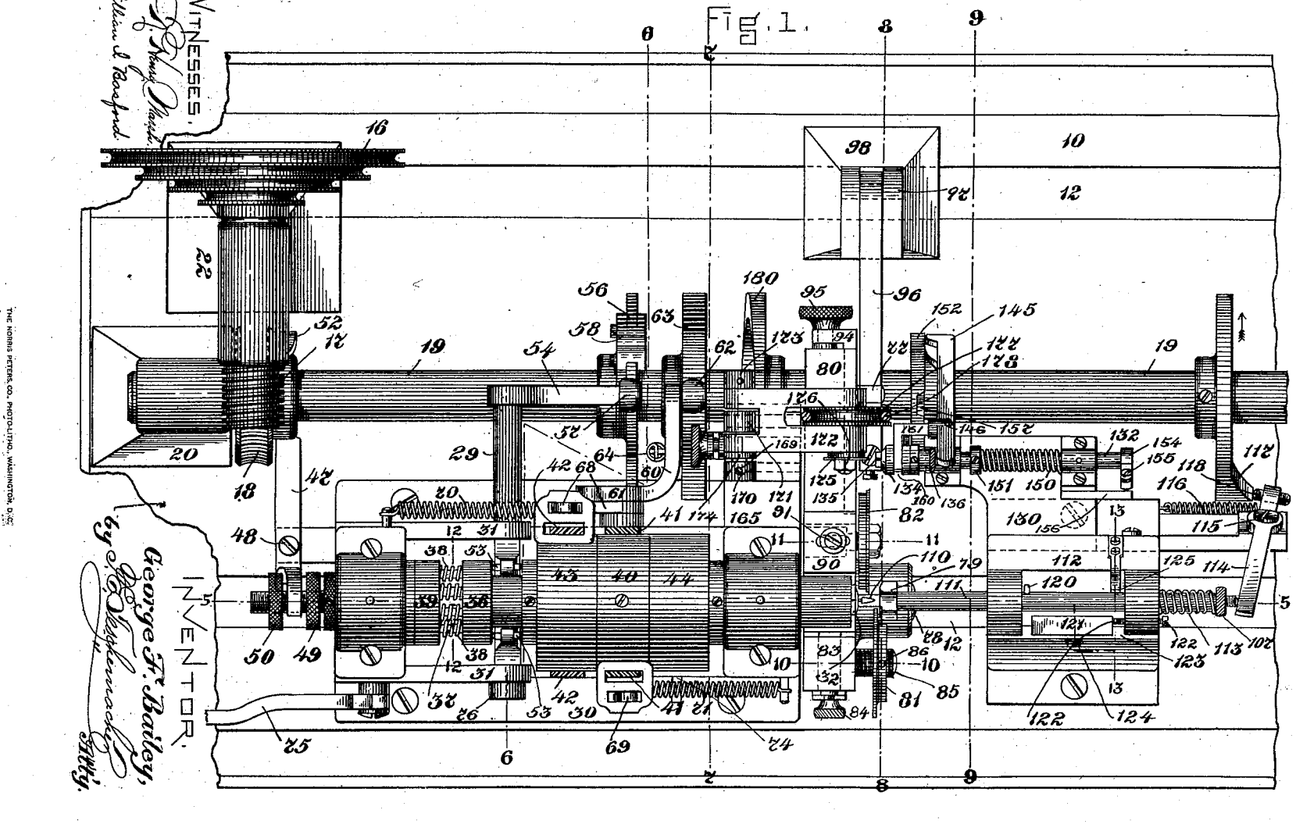
Figure 1 is a plan view of a screw-machine constructed in accordance with my invention, the threading-die plunger and die being about to recede and the slotting-saw being half-way through the head of a screw previously made.
Figures 1, 2:
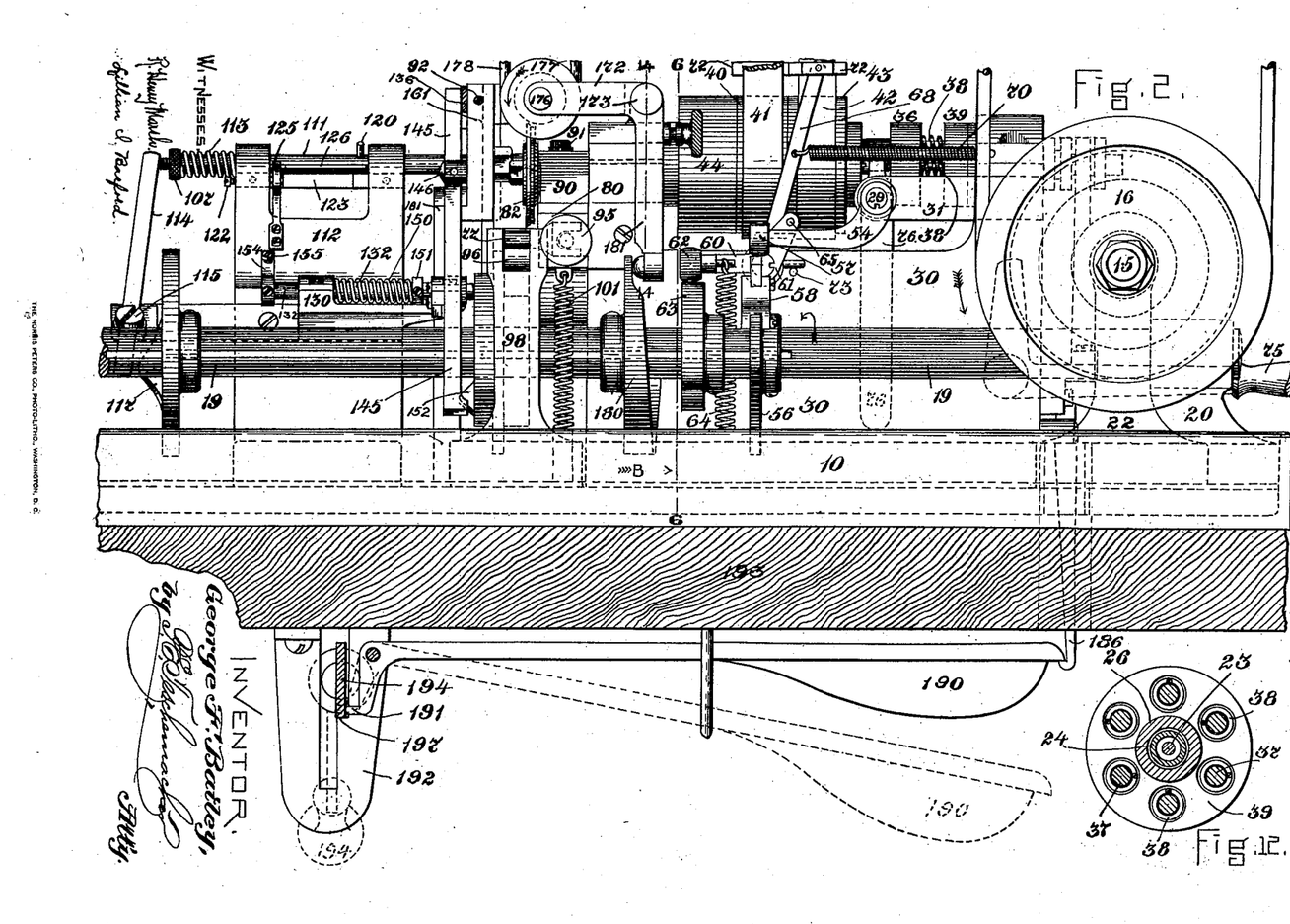
Fig. 2 is a rear elevation of the machine.
Figures 3, 15, 16:
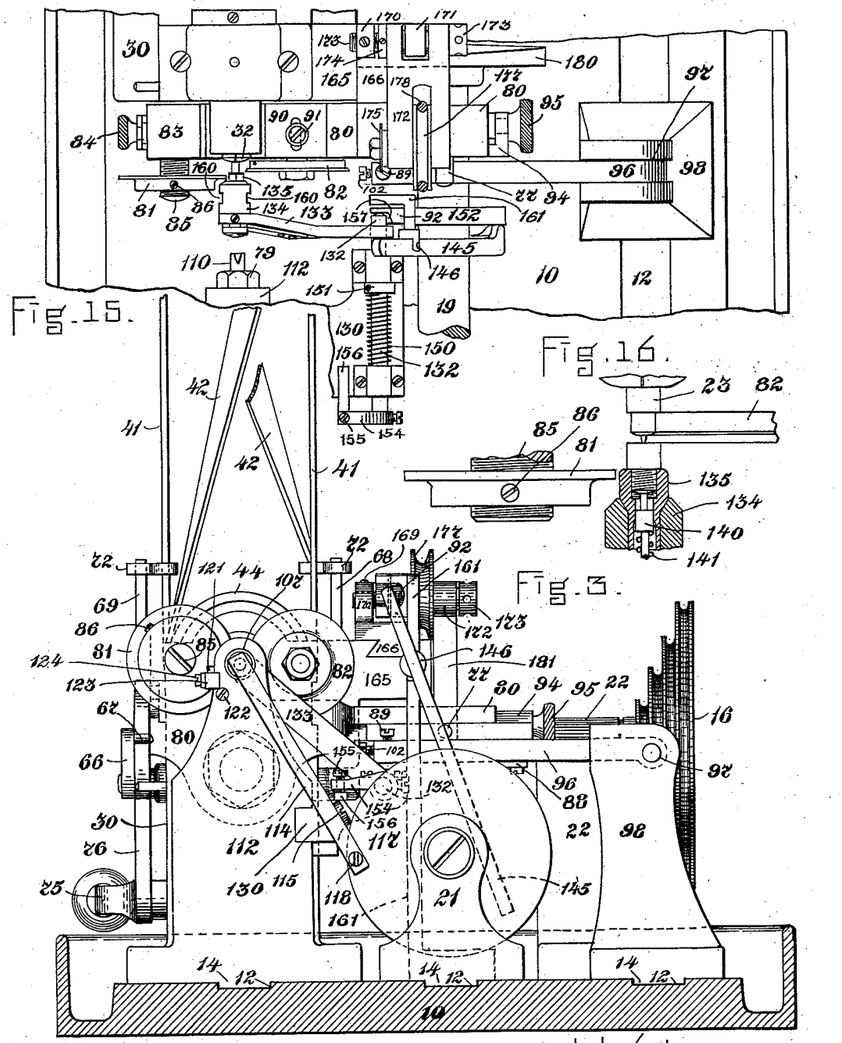
Fig. 3 is an end view showing the tail-stock and parts adjacent thereto.
Fig. 15 is a plan view of the portion of the machine shown in Fig. 9$^a$, but with the parts in a different position.
Fig. 16 is a sectional detail of the transfer-arm chuck, showing a screw therein which has been nearly severed from the end of the stock-rod by the cutting-tool.
Figure 13:
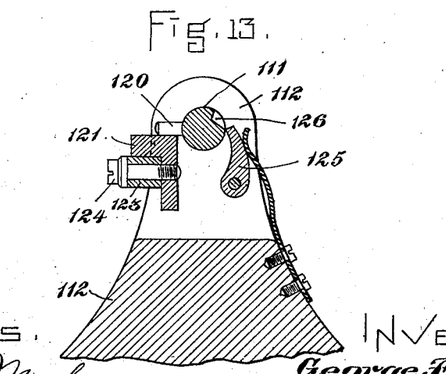
Fig. 13 is a sectional detail on the line 13 13 of Fig. 1.

110 is the threading-die, which is secured to the end of a horizontally-sliding spindle or plunger 111, mounted in suitable bearings in the tail-stock 112 and encircled outside its bearings by a spiral spring 113, bearing at one end against the tail-stock and at the other end against an adjustable collar 107 on the plunger. The die-plunger is forced forward against the resistance of the spring 113 to cause the die to engage the end of the screw by a lever 114, fulcrumed at 115 and moved against the resistance of a spring 116 (shown in Fig. 1) by a cam 117 on the cam-shaft 19 to cause it to strike the outer end of the die-plunger at the required time, as shown in Figs. 1, 2, and 3. The lever 114 is not at all times in contact with the die-plunger, being moved up to the same by the cam 117. This enables the amount of longitudinal movement of the die-plunger to be varied for screws of different lengths. The lever 114 is provided with an adjusting-screw 118, which rests on the cam 117, and by means of this screw the advance of the die-plunger may be regulated with great nicety. The die-plunger and die are prevented from revolving while the thread is being cut by a pin 120, projecting at right angles from said plunger over and resting upon the edge of a horizontal block 121, adjustable longitudinally by means of a screw 122 on a bar 123, fastened to the tail-stock and held in place by a binding-screw 124. (Shown in Figs. 1 and 13.) As soon as the pin 120 reaches the end of the block 121 it drops off the same, when the die-plunger and die will revolve with the stock, thus stopping the further cutting of the thread, immediately after which the straight belt 41 is shipped onto the loose pulley 43 at the right and the crossed belt 42 is brought onto the fast pulley 40, reversing the motion of the spindle 34 and causing the threading-die to be backed off the screw, the die and die-plunger being then held from revolving by a pawl 125, which is pivoted to the tail-stock, and instantly engages a longitudinal groove 126 in the die-plunger, which is thus locked to cause the threading-die to be backed off the screw, and as soon as it is disengaged therefrom the spring 113 carries the die-plunger back to its normal position, the lever 114 having been previously withdrawn.

The threading-die is secured to the end of the die-plunger 111 by means of a coupling-nut 79, which on the withdrawal of the die-plunger is brought into contact with the front end of the tail-stock 112, which thus forms a stop to limit the backward movement of said plunger. The crossed belt 42 is now immediately shipped onto the loose pulley 44 on the left, when the rotation of the chuck-spindle will be arrested. The spindle, with the stock, now being at rest the gripping-chuck 32 is opened by the action of the cam 56, as previously described, thus releasing the stock, which is then fed forward by the push-chuck 25 against the disk stop 81, which has been previously advanced to intercept it. The straight belt 41 is then shipped onto the fast pulley 40 and the rocker 80 oscillated to bring the cutting-tool 82 into action to cut off the screw previously formed and at the same time turn the stock to form the next screw. The length of the thread cut on the screw is determined by adjusting the sliding block 121 to vary the time when the pin 120 will drop off its end on the forward movement of the plunger and die.

Figures 9, 17:
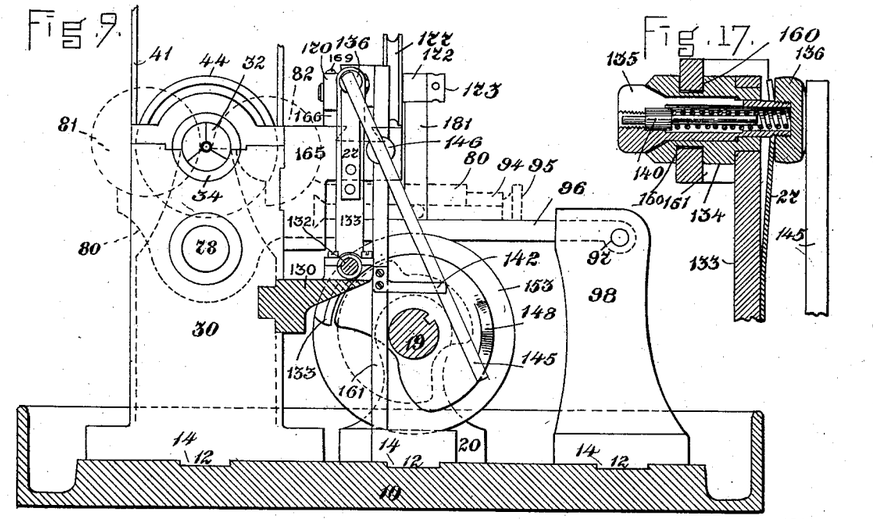
Fig. 9 is a transverse vertical section on the line 9 9 of Fig. 1, the rocker-frame and parts connected therewith being shown in dotted lines.
Fig. 17 is an enlarged vertical section of the upper end of the transfer-arm and its screw-receiving chuck.
Figures 9A, 18:
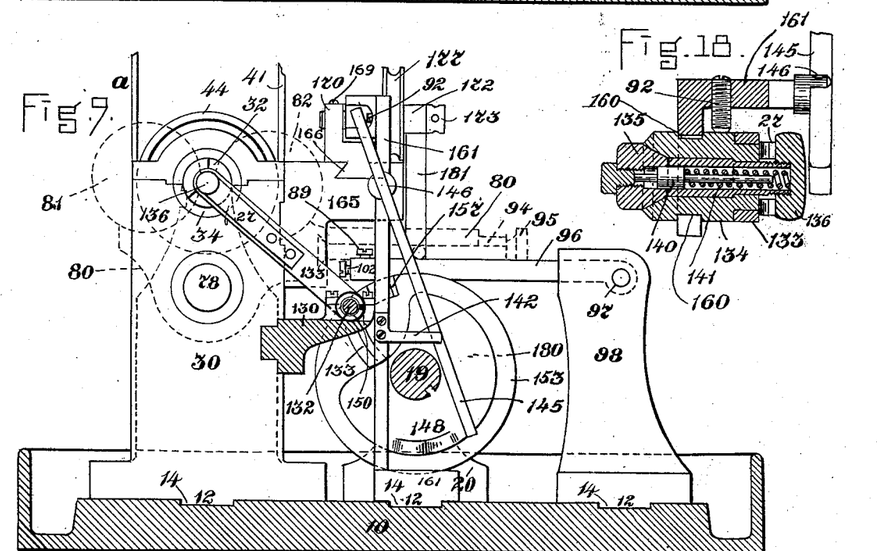

The mechanism by which the threaded screw after being severed from the stock rod or wire is transferred to the position where it is acted upon by a saw to form the slot in the head will now be described. On the rear side of the tail-stock 112 is a rectangular groove, in which is secured a bracket 130, provided on its outer edge with two journal-boxes, in which is supported a horizontal rock-shaft 132, to the inner end of which is secured a swinging arm or lever 133, termed the "transfer-arm." This arm is provided at its outer end with a hub 134, within which is placed a chuck 135, split lengthwise to form spring-jaws, which are interiorly threaded to receive the screw when the transfer-arm is swung over to bring said chuck into alinement therewith. The chuck 135, the jaws of which normally spring open, has a cone-shaped outer end fitting within the correspondingly-beveled end of the hub 134 and drawn inwardly to keep the jaws closed by a flat spring 27, secured to the transfer-arm and acting against a nut 136, screwed onto the end of the chuck 135, which projects outside the hub 134. Within the rear hollow portion of the chuck 135 is placed a small plunger 140, provided with a shoulder, against which bears one end of a spiral spring 141, the opposite end of which bears against the nut 136, the pressure of the spring tending to keep the front end of the plunger within the front or threaded portion of the chuck, as shown in Fig. 17, the screw when entering said chuck forcing back the plunger against the resistance of the spring 141, as shown in Fig. 18, which spring, when the chuck is opened by mechanism to be presently described, throws the plunger forward and ejects or snaps out the finished screw into a trough or spout, down which it passes into a suitable receptacle. (Not shown.) The chuck 135 is forced outward within the hub to open it and permit its chuck to automatically open and release the screw at the proper time by means of a lever 145, fulcrumed at 146 and bearing on the rear end of the chuck, said lever being actuated against the resistance of a spring 142 by a cam 148 on the shaft 19. (Shown in Figs. 9 and 9ª.)

The transfer-arm rock-shaft 132 is encircled by a spring 150, one end of which is secured to a collar 151 on the shaft and the other end to the bracket 130, said spring acting to rotate the shaft to swing the transfer-arm 133 over to bring its chuck into position to take the screw when permitted to do so by a cam 152 on the cam-shaft 19, in contact with which the lower end of the transfer-arm is held by said spring 150. The collar 151 is made adjustable lengthwise of the shaft 132 to regulate the horizontal pressure of the spring 150 and also axially to regulate the torsional stress of said spring, which not only exerts a pressure on the shaft 132 in the direction of its length, but also by its tendency to uncoil imparts the desired axial movement to the shaft to swing down the transfer-arm 133, as before described. The downward movement of the transfer-arm is limited by a crank-arm 154, secured to the end of the shaft 132 and provided with an adjusting-screw 155, which contacts with a stop 156, projecting from the bracket 130, whereby the transfer-arm chuck is brought into exact axial alinement with the screw formed at the end of the stock. The upward movement of the transfer-arm is regulated and limited to bring the screw held in its chuck into exact alinement with the slotting-saw by means of an adjusting-screw 92, Fig. 18, passing horizontally through the upper end of a standard 161, rising from the bed-plate. The spring 150 tends to keep the inner end of the transfer-arm shaft 132 in contact with the face of a cam-disk 153 on the cam-shaft 19, said disk having a notch or depression 157, into which the end of the shaft 132 is forced by the action of the spring 150 at the moment that the transfer-arm chuck comes into line axially with the screw, the endwise movement of the shaft thus permitted by the notch 157 causing the threaded chuck 135 to advance and engage the end of the screw. The sides of the depression 157 are rounded, whereby as the disk is rotated the end of the shaft will be forced out of the depression against the resistance of the spring 150 to restore the transfer-arm to its original vertical plane before it begins to swing upward. The swinging down of the transfer-arm takes place while the cutter is turning the stock, and when the screw is nearly cut off the threaded chuck 135 engages the revolving screw, which as soon as it is screwed into the chuck up to its head is broken off from the end of the wire or stock from which said screw has been nearly cut off. Enough material is left by the cutter to enable the screw to be turned into the transfer-chuck up to its head, the teat remaining on the screw-head by reason of breaking it off being removed by the saw which cuts the slot in the head of the screw. As soon as the chuck has taken the screw the transfer-arm 133 is swung upward by its cam against the influence of the spring 150 into a position to bring the screw into line with the slotting-saw to be presently described, and when in this position the hub 134, which is provided on opposite sides with two grooves 160, is embraced by the forked upper end of the standard 161, rising from the bed-plate, the forks of said standard entering said grooves and holding the hub and chuck firmly while the slotting-saw is operating on the head of the screw. To still further insure the firm holding of the hub and chuck and prevent any possibility of the transfer-arm chattering while the screw-head is being slotted, the transfer-arm shaft 132 is forced slightly to the right by a slight rise on the face of the cam-disk 153—say .005 of an inch—with which the end of said shaft is in contact, which causes the sides of the grooves in the hub to be forced tightly against the embracing-forks of the standard 161, the binding of the surfaces in contact thus preventing any possibility of the movement or chattering of the parts while the slot is being cut.

Figure 4:
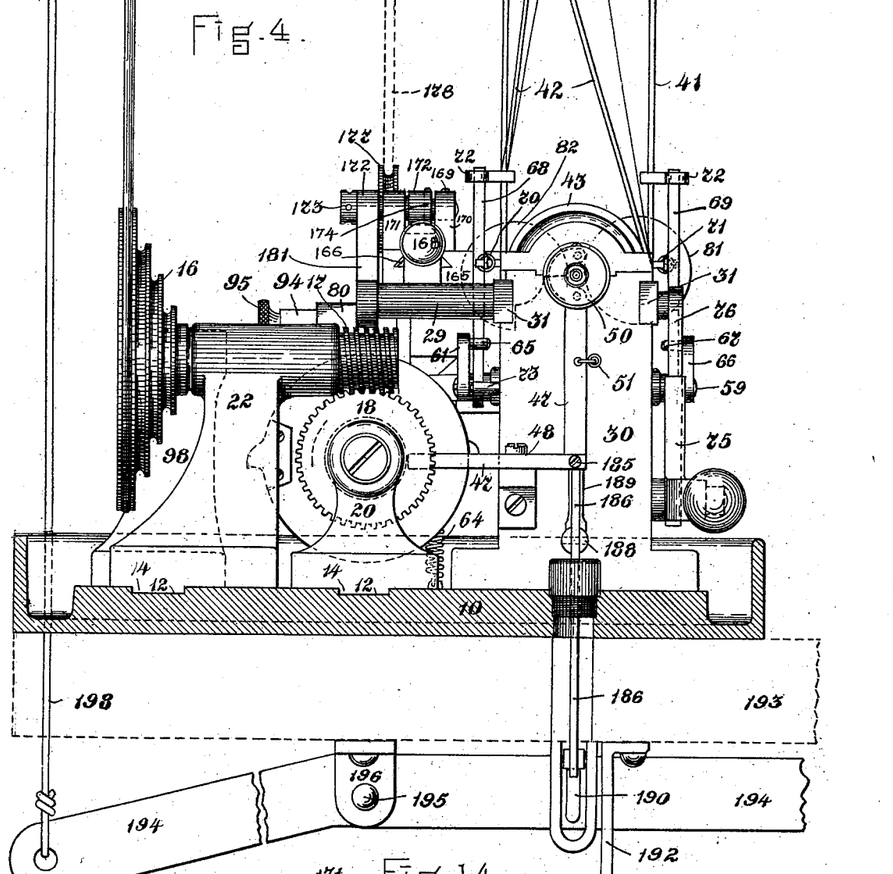
Fig. 4 is an elevation of the end of the machine opposite to that shown in Fig. 3.
Figure 14:
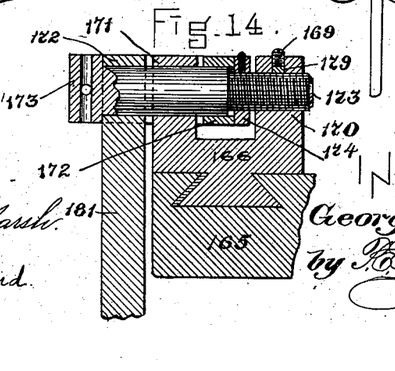
Fig. 14 is an enlarged vertical section on the line 14 14 of Fig. 2, showing the means for adjusting the saw-frame for variations in diameter of screw-heads.
Figure 19:
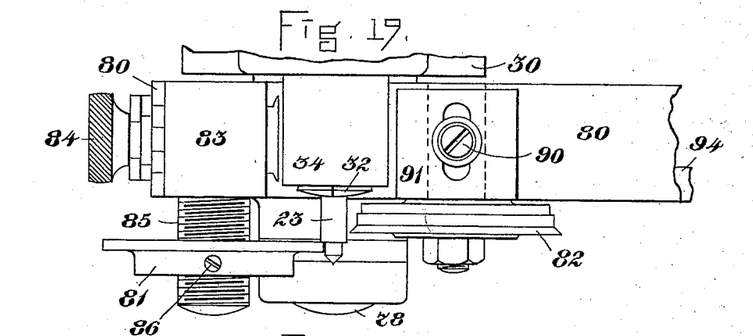
Fig. 19 is an enlarged detail in plan, showing the stop adjusted on its stud into a position to intercept the stock by contact with the shoulder formed by the screw-head.
Figure 20:
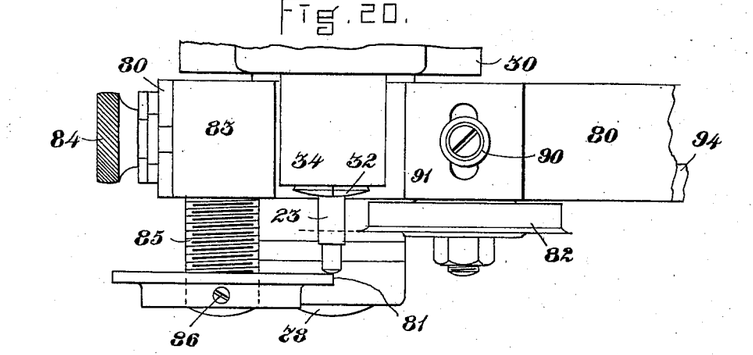
Fig. 20 is a similar view showing the stop adjusted to intercept the point or end of the stock-rod.

The mechanism for cutting the slot in the head of the screw will now be described. To the rear side of the head-stock, near its right-hand end, is secured a bracket 165, in a dovetail groove in which is fitted a slide 166, adjustable lengthwise of the machine by means of a screw 168, said slide having two upwardly-projecting ears or lugs 170 171. 172 is the saw-frame, which is pivoted to the lugs 170 171 by means of a capstan-headed screw 173, said frame carrying at its outer end the slotting-saw 175, removably secured to a shaft or arbor 176, to which is also secured a small pulley 177, driven by a belt 178 from a pulley on a counter-shaft. (Not shown.) The saw-frame is held with the end of one side between the two lugs 170 171 and the end of the other side outside the lug 171, as shown in Figs. 1, 4, and 14, the screw 173 passing through said lugs and ends of the frame and engaging a thread in the bore of the lug 170. At the inner end of the threaded portion of the screw 173 is a collar 174, which acts on one side of the saw-frame to move it in one direction, while the head of the screw 173 acts on the other side of the frame to move it in the opposite direction. The saw-frame may be thus adjusted transversely of the machine to bring saws of different widths which it may be found necessary to employ exactly in line with the center of the head of the screw to be slotted. The adjusting-screw 173 is clamped after being turned to adjust the saw-frame by means of a set-screw 169 bearing on a soft-metal plug 179 in contact with the screw-thread, which is thus prevented from being injured by the set-screw. As soon as the screw has been brought into line with the saw by the movement of the transfer-arm, as previously described, the saw-frame is rocked on its pivots to carry the saw down to cut the slot in the head of the screw by a cam 180 on the cam-shaft 19, which acts on the lower end of an arm 181, depending from the saw-frame, the saw and saw-frame being returned to their normal positions by the tension of the driving-belt 178 when permitted to do so by the revolution of the cam 180.

By adjusting the slide 166 in the direction of the length of the machine by means of the screw 168 the saw-frame and saw may be moved forward or retracted to bring the saw into the exact position required for heads of different lengths or to form slots of different depths.

As soon as the slot has been cut in the screw-head the chuck 135 is opened by the means described, when the screw will be ejected by the spring-actuated plunger 140 and the pressure of the cam-disk 153 on the end of the transfer-arm shaft at the same time relieved, thus releasing the hub 134, when the parts are ready to operate as before.

I will now describe the stop-motion by means of which the machine is stopped automatically as soon as the stock-wire becomes exhausted or shortened to such an extent that the feed-chuck 25 can no longer take hold of it. When this occurs, the feed-tube 24 is free to be carried forward by the spring 51, Figs. 4 and 5, acting through the lever 47, farther than is the case when it is clutching the stock, which brings a regulating-screw 185 on said lever 47 into contact with the upper end of a lever 186, fulcrumed at 188, which lever is then moved against the resistance of a flat spring 189, thus tripping a weighted lever 190, the outer end of the long arm of which rests on a hook at the lower end of said lever 186. The lever 190 is fulcrumed to a U-shaped bracket or hanger 192, depending from the under side of the bench 193, on which rests the bed of the machine. Through this hanger passes, at right angles to the lever 190, a weighted lever 194, fulcrumed at 195, Fig. 4, to a hanger 196 on the under side of the bench, said lever 194 resting on a shoulder 197, Fig. 2, formed on the inside of the hanger and having attached to one end a wire rod 198, Fig. 4, which is connected with a belt-shipper (not shown) controlling the main driving-pulley. When the weighted lever 190 is tripped, as above described, a projection 191 on its short angular arm forces the weighted lever 194 off the shoulder 197, when it will drop, and thus through the connections described operate the belt-shipper and stop the machine.

What I claim as my invention, and desire to secure by Letters Patent, is—

1. In a screw-machine, the combination with the outer tubular spindle having a fast pulley and a loose pulley on each side of said fast pulley, of a belt-shipping device consisting of a transverse rock-shaft, two arms secured to said shaft and arranged at an angle to each other on opposite sides of the head-stock, each arm being provided with a stud projecting at right angles therefrom, two belt-shipping arms pivoted loosely upon the rock-shaft and provided on opposite sides of the head-stock at their upper ends with guides for a straight and a crossed belt, springs for holding the shipping-arms in contact with the studs of the arms secured to the rock-shaft, stops for said belt-shipping arms, and a cam for actuating said rock-shaft, substantially as described.

2. In a screw-machine, the combination with a stock-holding chuck, of a rocker oscillating in a vertical plane at right angles to the axis of the chuck and provided on one side of the front end of said chuck with a stop against which the stock-rod is fed to determine the length of the screw and on the opposite side with a cutting-tool for turning the stock, and means for oscillating the rocker to alternately bring the stop and cutting-tool into their operative positions, substantially as described.

3. In a screw-machine, the combination with the head-stock and stock-holding chuck, of an oscillating rocker provided with a stop and a cutting-tool arranged on opposite sides of the front end of the holding-chuck, a slide adjustable on said rocker transversely of the stock-holding chuck and having a horizontally-extending pin or projection, a lever forming a rest for said pin and upon which said pin may be moved with the slide toward and away from the fulcrum of the lever to vary the movement of the rocker, and means for moving the lever and rocker, substantially as described.

4. In a screw-machine, the combination with a stock-holding chuck, of a rocker oscillating in a plane at right angles to the axis of the chuck and carrying a stop and a cutting-tool arranged on opposite sides of the front end of the chuck, a lever parallel with the rocker, a slide longitudinally movable on said rocker and provided with a pin resting on the lever, said slide being made adjustable, whereby the distance of the pin from the fulcrum of the lever may be varied, a cam for moving the lever and rocker in one direction and a spring for moving them in the opposite direction, substantially as described.

5. In a screw-machine, the combination with the stock-holding chuck, of the oscillating rocker with its adjustable stop and cutting-tool, a slide adjustable on said rocker in the direction of its length and provided with a pin or projection, a lever forming a rest for said pin and upon which it may be moved with the slide toward and away from the fulcrum of the lever, said lever being provided on its under side with an adjustable toe, a cam contacting with said toe for actuating said lever, and a spring connected with the rocker and acting to keep the pin in contact with the lever and the toe in contact with the cam, substantially as described.

6. In a screw-machine, the combination with the stock-holding chuck, of the oscillating rocker having a stud projecting at right angles therefrom on one side of the front end of said chuck, and a stop for the stock-rod adjustable on said stud in the direction of its length and adapted by the movement of the rocker to be brought into position to intercept the stock as it is fed forward, substantially as described.

7. In a screw-machine, the combination with the stock-holding chuck, of the rocker provided with a slide adjustable transversely thereof, a threaded stud projecting from said slide, a rotatable stop adjustable on said stud lengthwise of the machine, and means for clamping the stop when adjusted, substantially as described.

8. In a screw-machine, the combination of the transfer-arm and its threaded screw-receiving chuck provided with spring-jaws having beveled outer surfaces, said chuck being movable longitudinally within the hollow end of the transfer-arm, the latter provided with a beveled mouth coöperating with said beveled jaws, a spring for drawing the chuck within the end of the transfer-arm to normally close the jaws, a spring-actuated plunger movable longitudinally within the chuck and adapted to be forced back by the screw as it enters said chuck, a lever acting on the chuck to open its jaws, and means for actuating said lever, said plunger acting to eject the screw when released by the chuck-jaws, substantially as described.

9. In a screw-machine, the combination with the swinging transfer-arm and its rock-shaft, said arm being provided at its upper end with grooves and carrying a screw-receiving chuck, of a standard forked at its upper end and adapted to receive and embrace said grooved end of the transfer-arm, and means for giving a slight endwise movement to the rock-shaft, whereby the transfer-arm is forced laterally against the forks of the standard to lock it in place while the screw-head is being slotted by the saw, substantially as described.

10. In a screw-machine, a slotting-saw mounted in a frame swinging in a vertical plane and adjustable toward and from the screw-head to be slotted and also in a direction at right angles to the axis of the screw to bring the saw into exact alinement with the center of the screw-head, substantially as described.

11. In a screw-machine, the combination with means for holding the screw while the head is being slotted, of a slide adjustable toward and from the screw-holder, a saw-frame pivoted to said slide and provided with a slotting-saw, said frame swinging up and down in the arc of a circle and being adjustable in a direction at right angles to the axis of the screw to be slotted to bring the saw into alinement with the center of the screw-head, substantially as described.

12. In a screw-machine, the combination with the longitudinally-reciprocating stock-feeding spindle with its friction-chuck, and the lever and spring for reciprocating said spindle, of an automatic stop-motion consisting of a weighted-lever mechanism connected with a belt-shipper and adapted to be tripped by a forward movement of the feed-spindle beyond its normal working limit, substantially as described.

13. In a screw-machine, the combination with the longitudinally-reciprocating stock-feeding spindle with its friction-chuck, and means for reciprocating said spindle, of an automatic stop-motion consisting of a catch-lever adapted to be actuated by an excessive forward movement of the stock-feeding spindle, a weighted lever having its free end supported by the catch-lever, a second weighted lever arranged at right angles to the first-mentioned weighted lever and adapted to engage a shoulder on the hanger to which the first-mentioned weighted lever is pivoted, said second weighted lever being connected with belt-shipping mechanism and being tripped by the fall of the first-mentioned weighted lever to stop the machine when the stock-rod has become exhausted so that it can no longer be fed forward, substantially as described.

Witness my hand this 24th day of October, A. D. 1900.

GEORGE F. BAILEY.

In presence of—
R. M. STARK,
JOHN A. TOLMAN.